United States Patent Office 3,338,495
Patented Aug. 29, 1967

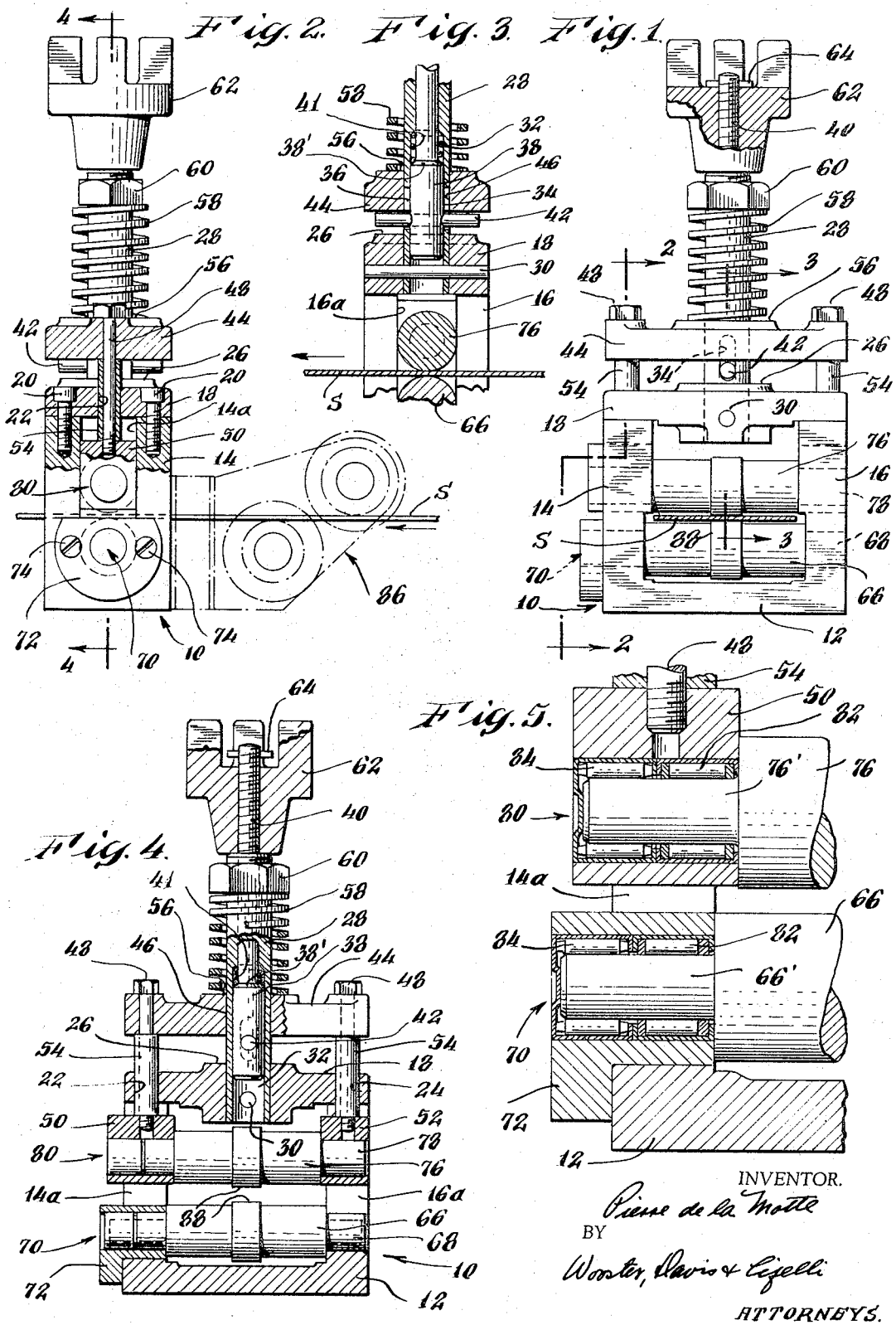

3,338,495
ADJUSTABLY BIASED SEPARABLE PRESSURE ASSEMBLY
Pierre de la Motte, Trumbull, Conn., assignor to The U. S. Baird Corporation, Stratford, Conn., a corporation of Connecticut
Filed Aug. 4, 1965, Ser. No. 477,227
8 Claims. (Cl. 226—177)

This invention relates to adjustable pressure assemblies and, more particularly, to roller checks of the type wherein metal stock is fed between a pair of spring loaded rollers, at least one of the rollers including a clutch permitting the stock to be fed freely in the forward direction but locking against reverse movement.

It is important, in most operations, that the pressure between the two rollers of a roller check be maintained at a constant value for a certain type of stock. This pressure is achieved by means of a nut which compresses a spring which, in turn, forces one of the rollers inwardly toward the other. However, it is also important that the rollers be readily separable in order to start a new length of stock or to remove stock already in position. The requirement that the rollers be readily separable without disturbing the critical spring adjustment has created a number of difficult problems which have not been satisfactorily solved by the prior art. One approach which has been employed has been the use of a rotatable circular cam mounted to bear against the portion of the roller check assembly which carries the adjustable roller. The cam has a generally "zig-zag" profile so that it includes high and low, but no intermediate, positions. As the cam works against the force of the spring, an actuating lever must be employed in rotating the cam to give sufficient leverage to lift the roller against the force of the spring. As the cam is quite steep, it is difficult to adjust, and efforts to do so often result in skinning the knuckles of the operator. In order to alleviate this situation, it has been a common practice ot back off the spring adjusting nut in order to relieve the pressure to more easily actuate the cam. This disturbs the spring adjustment and nullifies the advantages obtained by the cam. It would also be desirable to be able to adjust the opening between the rollers intermediate the full open and full closed positions and to avoid the limitation on maximum separation resulting from the cam profile.

Accordingly, it is a primary object of the present invention to provide an improved roller check. Other objects are to provide such a roller check wherein the rollers may be easily separated a substantial amount without disturbing the spring adjustment; wherein the maximum separation is not limited by a cam profile; and wherein the rollers may be separated by any distance between full open and full closed.

The manner in which the foregoing objects are achieved will be more apparent from the following description, the appended claims, and the figures of the attached drawing wherein:

FIG. 1 is a front view of a roller check in accordance with this invention, a portion thereof being broken away to more fully illustrate its construction;

FIG. 2 is a left side view of the roller check of FIG. 1 in partial cross-section taken substantially along the line 2—2 of FIG. 1;

FIG. 3 is a cross-section taken substantially along the line 3—3 of FIG. 1;

FIG. 4 is a cross-section taken substantially along the line 4—4 of FIG. 2; and, FIG. 5 is an enlarged cross-section showing in detail the bearing ends of the rollers.

In accordance with the present invention there is provided a base member which carries a fixed roller and includes an upwardly extending hollow support shaft. A yoke is vertically slidable along the support shaft and carries an adjustable roller. An adjusting nut on the upper end of the support shaft compresses a spring which bears downward on the yoke. Slidably mounted within the support shaft is a release shaft which has its lower end in lifting engagement with the yoke. A lift nut is screwed on the upper end of the release shaft and bears against the top of the support shaft. The yoke and adjustable roller may be lifted by the lift nut without disturbing the adjusting nut.

With particular reference to FIGS. 1–3, the roller check of the invention will be seen to comprise a U-shaped body member 10 comprising a base 12 and left and right side members 14, 16, respectively. Each of the side members is slotted downward from its upper end so as to define rectangular guideway openings 14a, 16a therethrough. Mounted across the top of the left and right side members 14, 16 is a top cover 18, secured by means of cap screws 20 extending downward into the respective side members. The left end of the top cover 18 defines a vertical cylindrical passage 22 and the right end defines a similar passage 24. Each of the passages extends through the top cover 18 to the respective openings 14a, 16a in the side members. The top cover 18 also includes a central raised boss 26, surrounding a central opening in which is rigidly mounted the lower end of a hollow support shaft 28, by means of a spring pin 30. The support shaft 28 defines an axial opening 32 therethrough and opposite sides of the shaft are cut away to form diametrically opposed vertically longitudinal slots 34, 36 which extend into the axial opening. Slidably mounted within the axial opening 32 is a quick-release shaft 38 having an upper threaded portion 40 which extends out of the upper end of the support shaft 28. A small compression spring 41 mounted within opening 32 bears downwardly against a shoulder 38' on the quick release shaft. A lift pin 42 is fixedly mounted in shaft 38 and extends outwardly of the support shaft through the slots 34, 36.

Mounted above the top cover 18 is a lift plate 44 which includes a central opening 46 which fits slidably over the support shaft 28 above the lift pin 42. Each end of the lift plate 44 includes an opening through which extends a lift screw 48 which passes downwardly through the passages 22, 24 to threadedly engage a left bearing block 50 and a right bearing block 52. The lift plate 44 is spaced from the bearing blocks by means of cylindrical spacers 54 which surround the screws 48 and are slidable within the passages 22, 24. The lift plate 44, screws 48, and spacers 54 thus form a slidable yoke secured to bearing blocks 50, 52. At the top of lift plate 44 is a boss 56 which supports the bottom of a coil spring 58. Spring 58 extends upwardly around the support shaft 28 and its upper end is engaged by a nut 60 which is threadedly secured to the top of support shaft 28. The upper portion 40 of release shaft 38 threadedly engages a castellated lift nut 62 which bears against the upper end of the support shaft 28. A pin 64 mounted in the threaded portion 40 prevents inadvertent removal of lift nut 62.

A lower roller 66 is mounted between the side members 14, 16 by means of a roller bearing assembly 68, secured at the bottom of opening 16a, and a roller check assembly 70 mounted in a fixed bearing block 72 secured to the left side member 14 by means of screws 74. Mounted between the left bearing block 50 and right bearing block 52 is an upper roller 76. The upper roller 76 is secured by a roller bearing assembly 78 fixed in right bearing block 52 and a roller check assembly 80 fixed in bearing block 50. Roller check assemblies 70, 80 comprise commercially available elements positioned as shown in FIG. 5. The left end shaft 66' of roller 66 is positioned to roll within a roller clutch 82 and a needle bearing assembly 84 which are axially aligned within the fixed bearing block 72. A similar roller clutch 82 and a needle bearing assembly 84 are axially aligned within the bearing block 50 to support the left end shaft 76' of upper roller 76. The orientation of the roller clutches 82 is such that the rollers will permit stock to feed in one direction only. This would be from right to left, as viewed in FIG. 2.

The operation of the roller check of this invention will now be described by assuming, first, that a length of strip stock S has been fed through guide rollers 86 to extend between the rollers 66, 76, as shown in FIGS. 1–3. The nut 60 is tightened downward on support shaft 28, thereby compressing the spring 58 which exerts a downward force against the boss 56 and lift plate 44. As lift plate 44 is slidable relative to top cover 18, the screws 48 and spacers 54 transmit this downward force to the left bearing block 50 and the right bearing block 52 which are respectively slidable within the openings 14a and 16a of the left and right side members. As these bearing blocks support the upper roller 76 therebetween, the roller is forced downward against the stock S with the desired amount of pressure, which is transmitted to the stock primarily through central enlarged portions 88 on the rollers. Suppose, now that it is desired to lift the upper roller 76 so as to free the strip stock S. The castellated lift nut 62 is rotated clockwise on the threaded portion 40 of the release shaft 38. To this end, a lever bar may be inserted into the castellated portion of the lift nut. As the lift nut 62 is thus tightened, it is prevented from moving downward by the upper end of the support shaft 28. Accordingly, the release shaft 38 is lifted within the opening 32 of the support shaft, the lift pin 42 sliding upwardly within the slots 34, 36. As the lift pin 42 rises, it bears against the lower surface of the lift plate 44, causing this plate to be raised against the force of spring 58. As the lift plate 44 is fixedly secured to the bearing blocks 50, 52 by means of the screws 48 and spacers 54, these bearing blocks are also lifted, together with the upper roller 76 which is mounted therebetween. The roller 76 is illustrated in its raised position in FIG. 4. It will be immediately apparent that the only limitations on the lifting of roller 76 are at its upper and lower positions—the lower position being fixed by roller 66 and the upper position being fixed by the space available within the openings 14a, 16a for the upward travel of the bearing blocks 50, 52 or by the vertical dimensions of the slots 34, 36. Between these limits, the spacing between the rollers is infinitely variable. Furthermore, this variability is accomplished without disturbing the initial adjustment of spring 58. This is so because the lift nut 62 may now be reversed in direction, thus lowering the upper roller 76 back onto a newly inserted piece of strip stock. The lift nut 62 may be loosened until the lift pin 42 no longer exerts upward pressure against lift plate 44. Under these circumstances, the assembly has been returned to its original position and the spring 58 exerts the same downward force as before. The force exerted by the spring 58 is adjustable only by the spring nut 60 and no adjustment of this nut is required to vary the roller spacing. Spring 41 serves to prevent vibration and "chattering" of shaft 38 when the lift pin 42 is released from lift plate 44.

It will now be apparent to those skilled in the art that all of the objectives set forth above have been achieved by the present invention. It will also be apparent that a number of variations and modifications may be made in this invention without departing from its spirit and scope. For example, the improved infinitely adjustably biased and separable roller assembly can be incorporated into a stock drag or stock roll feed, as well as the illustrated stock roller check; in fact, wherever two adjustably biased separable members are employed. Accordingly, the foregoing description is to be construed as illustrative only, rather than limiting. This invention is limited only by the scope of the following claims.

What I claim as new and desire to secure by Letters Patent of the United States is:

1. An adjustable roller assembly which comprises: a base member defining an opening therethrough; a first roller fixedly mounted within said opening for rotation about a first axis; a hollow support member fixed to said base member and extending upwardly therefrom; a yoke slidably mounted on said support member; first and second spaced bearing means on said yoke; a second roller mounted between said bearing means and within said opening for rotation about a second axis parallel to said first axis; a pressure adjusting nut threadedly engaging said support member; spring means intermediate said pressure adjusting nut and said yoke; a lift shaft slidably mounted within said hollow support member and including an upper and a lower end; means interconnecting the lower end of said lift shaft in lifting relationship with said yoke; and lift nut means threadedly engaging the upper end of said lift shaft to raise and lower said shaft within said support member.

2. An adjustable roller assembly which comprises: a base, first and second spaced, parallel side members extending upwardly from said base, said side members defining aligned vertical first and second guideways therein; a first roller fixedly mounted between said side members for rotation about a first axis; a top cover extending to connect said first and second side members; a hollow support shaft having a first lower end secured to said top cover and an externally threaded upper end; a lift plate defining an opening therethrough encircling said support shaft; a second roller vertically movable in said guideways and rotatable about a second axis parallel to said first axis; connecting means interconnecting said second roller and said lift plate; a pressure adjusting nut threadedly engaging the upper end of said support shaft; a coil spring encircling said support shaft intermediate said lift plate and said pressure adjusting nut; a release shaft vertically slidable within said hollow support shaft and including a threaded upper end extending therefrom; linkage means interconnecting the lower end of said release shaft with said lift plate; and a lift nut threadedly engaging the upper end of said release shaft and seated against the upper end of said support shaft.

3. The assembly of claim 2 wherein said top cover defines first and second vertical passages therethrough communicating, respectively, with said first and second guideways and wherein said connecting means comprises first and second cylindrical spacers slidable, respectively, in said first and second passages.

4. The assembly of claim 3 wherein said second roller includes a first bearing block slidable in said first guideway and connected to said first spacer and a second bearing block slidable in said second guideway and connected to said second spacer.

5. The assembly of claim 2 wherein said hollow support shaft defines a pair of diametrically aligned vertical slots therein and wherein said linkage means comprises a lift pin carried by the lower end of said release shaft and extending through said slots and arranged to engage the lower surface of said lift plate.

6. An adjustable roller assembly which comprises: a substantially rectangular planar base member; first and second spaced, parallel side members extending upwardly from opposite ends of said base member, said side members defining aligned, vertical, first and second guideways therethrough; first and second bearing means fixedly mounted, respectively, in said first and second side members; a first roller rotatably supported by said first and second bearing means adjacent said base member; a top cover extending across the upper ends of said first and second side members, said top cover defining first and second vertical passages therethrough communicating, respectively, with said first and second guideways; a hollow vertical support shaft having a first, lower, end secured to said top cover and an externally threaded upper end, said support shaft defining a pair of diametrically aligned vertical slots therein; a substantially rectangular lift plate defining a central opening therethrough slidably encircling said support shaft; first and second bearing blocks slidably mounted, respectively, in said first and second guideways; first and second spacer means slidable in said first and second passages and interconnecting said lift plate with said bearing blocks; third and fourth bearing means mounted, respectively, in said first and second bearing blocks; a second roller rotatably supported by said third and fourth bearing means; a pressure adjusting nut threaded on the upper end of said support shaft; a coil spring encircling said support shaft and extending between said lift plate and said adjusting nut; a release shaft vertically slidable within said hollow support shaft and including a threaded upper end extending therefrom; a lift pin carried by the lower end of said release shaft and extending through said vertical slots and arranged to engage the lower surface of said lift plate; and a lift nut threadedly engaging the upper end of said release shaft and seated against the upper end of said support shaft.

7. The assembly of claim 6 wherein each of said first and third bearing means includes a roller clutch.

8. An assembly comprising: a base defining an opening therethrough; a first pressure means mounted in said opening; a hollow support secured to said base and extending upwardly therefrom; a yoke slidably mounted on said support; a pressure member carried by said yoke within said opening; spring means biasing said pressure member against said pressure means; an adjusting nut threadedly secured to said support and arranged to adjustably compress said spring; a lift shaft slidably mounted within said support and having an upper and a lower end; means selectively interconnecting said lower end in lifting relationship with said yoke; and lift nut means threadedly secured to said upper end and arranged to raise and lower said shaft within said support.

References Cited
UNITED STATES PATENTS

| | | | |
|---|---|---|---|
| 625,211 | 5/1899 | Stoff | 226—177 |
| 2,503,994 | 4/1950 | Bottos | 226—176 X |
| 2,535,234 | 12/1950 | Schwartz | 226—177 X |
| 2,691,328 | 10/1954 | Evers | 226—187 X |
| 2,796,781 | 6/1957 | Mills | 226—176 X |
| 3,147,901 | 9/1964 | Nordman et al. | 226—176 |

M. HENSON WOOD, JR., *Primary Examiner.*

A. N. KNOWLES, *Assistant Examiner.*